Jan. 10, 1928.

F. C. WALTER

BUMPER

Filed Aug. 1, 1927

1,656,026

Inventor
Fred C. Walter
By West & West
Attorneys

Patented Jan. 10, 1928.

1,656,026

UNITED STATES PATENT OFFICE.

FRED C. WALTER, OF CINCINNATI, OHIO, ASSIGNOR TO THE CINCINNATI BALL CRANK COMPANY, OF CINCINNATI, OHIO, A CORPORATION OF OHIO.

BUMPER.

Application filed August 1, 1927. Serial No. 209,681.

The invention relates to bumpers for automobiles in which a tubular impact bar is supported upon the ends of a pair of springs fixed to and extending from the frame of the vehicle.

The invention primarily is directed to the structure of the spring for sustaining the impact bar and provides a spring of a strip of metal shaped to possess the characteristics of plural superposed leaves for the vehicle connecting portion of the spring and of plural spaced loop formation for the impact receiving and impact bar sustaining portions. The loops at the impact bar are joined with a return bend for spacing the loops, the whole structure being of approximately U design, whereby the face or front loop presents a spring portion flexible and yieldable under light impact and carrying the impact bar and a second or rear loop as a reinforcement or brace for the first loop.

It is therefore an object of the invention to provide a pair of springs for a vehicle bumper or impact bar, each spring having a stable attaching portion of plural leaf formation for connecting the spring to the vehicle frame, and double flexible loops extending from the attaching portion, one loop carrying the impact bar and the second loop joining with and spaced from the first loop as a brace or reinforcement therefor under severe impacts.

Another object of the invention is to provide a spring of double loop formation for carrying the impact bar and a double thickness beyond the loops for connecting the spring to the vehicle frame, all formed from a single strip of spring metal bent upon itself and in approximately U-shape with one of the loops at its free end depressed to receive the tubular impact bar.

Further objects and advantages will be more fully set forth in the description of the accompanying drawing forming a part of this specification, in which.

Figure 1:
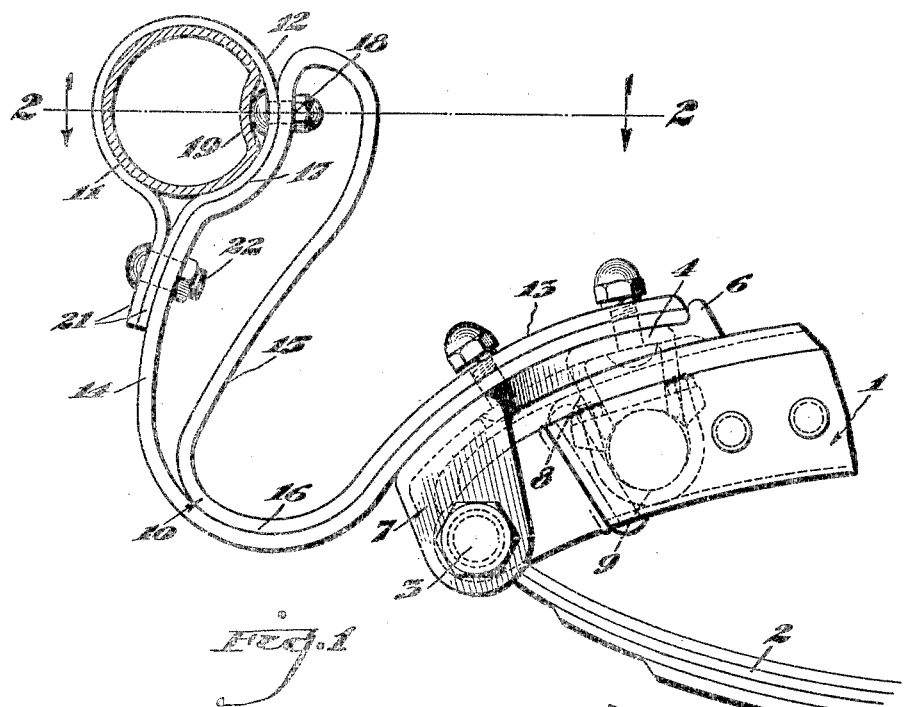
Figure 1 is a side elevation of the improved bumper spring or supporting member showing it attached to the forward end of an automobile chassis and showing the bumper bar in section and in position on the spring.
Figure 2:
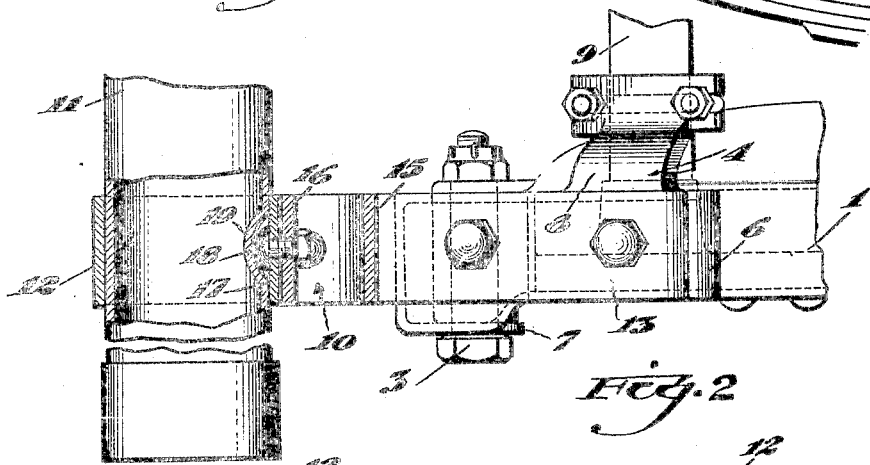
Figure 2 is a sectional view taken on line 2—2, Figure 1, showing the manner in which the bumper bar is secured against rotation in the spring or supporting member.
Figure 3:
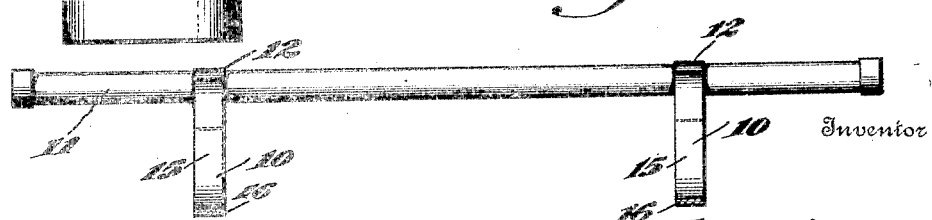
Figure 3 is a sectional view taken through the bumper springs, illustrating in elevation the horizontal tubular bumper bar held in place by the springs.

Referring to the drawings, 1 indicates an end of an automobile frame representing the commercial type of frame construction of channel bar, with a vehicle spring 2 connected thereto by a shackle bolt 3. The drawings only show one of the frame ends, similar construction following for the opposite sides of the frame with the ends slightly curved downwardly following the prevailing practice of automobile frame construction.

To meet the commercial conditions in the variation in frame end constructions, the bumper springs are preferably mounted upon brackets respectively fixed to the vehicle frame 1. In the present instance, the spring supporting bracket 4, is illustrated as being of a type shown and described in Patent No. 1,643,758, granted to me September 27, 1927, with the bracket resting upon the vehicle frame and securely bolted thereto at two or more points and arranged so that under impact the bracket will bear down upon the frame and transmit the shocks to the frame and car springs so that the car springs will materially relieve the bumper and connecting parts of the impact strains. The brackets thus present a curved form of seat for the attaching or tail end of the bumper springs to resist longitudinal movement of the springs.

The rear end of the bracket is formed with a cross rib or lug 6 extending above the upper or seat surface of the bracket as an abutment for the butt ends of the spring. A lug or ear 7 depends from one side of the plate for connecting the plate to the shackle bolt 3 which connects the car spring to the car frame. The brackets are preferably made of rights and lefts in a set to bring the lug at relatively opposite sides of the car frame, and each bracket is further provided with a lateral arm or lug 8 projecting therefrom at a side opposite the lug 7, and is adapted to be bolted to a cross rod 9 of the car frame.

It is recognized, however, that the bumper springs could be directly bolted upon the car frame or various other forms of attaching means employed, the means being employed being preferred on account of the feature of transmitting the impact strains to the car springs.

The bumper springs 10 and brackets for the bumper installation are used in pairs one set installed at each side of the car frame, the springs extending forwardly and upwardly from the frame, supporting an impact or cross bar 11 which constitutes a non-yielding tubular bar frictionally coupled or clamped to the forward upper ends of the springs by split clips 12. The springs and their impact bar connecting clips for each pair employed are of duplicate construction, and therefore, the detailed description thereof will be confined to the singular.

Each spring, therefore, comprises, or constitutes, an integral structure of strip or flat bar metal bent and shaped to approximately U-form and upon itself to provide a plural leaf or thickness of metal for the attaching end or portion 13 of the spring with the leaves thereof relatively superposed and engaging upon one another or lapped together and curved longitudinally corresponding to the curvature of the seat surface of the bracket 4 upon and to which the spring end is secured. The attaching end of the spring may be otherwise shaped to meet or correspond to any attaching surface, while in the preferred design certain advantages are obtained as it permits the spring attaching end to be seated upon the bracket or end of the vehicle frame, the curvature resisting longitudinal motion and providing for more securely bolting or clamping the spring to the car frame and not as liable to loosen up in service.

From the attaching end, the spring bends or curves to give the same U-form and provide a pair of flexible stanchions 14—15 which connect or join at their upper end by a return bend appropriately spacing the forward or first loop or stanchion 14 from the rearward or second loop or stanchion 15. The metal for each loop contacts for the return bend portion 16 as the juncture for the loops and attaching end beyond the bracket, giving the spring double or increased thickness of metal for the portion where the majority of breakage occurs.

The forward or first loop 14 at its upper end is depressed to provide a curved seat portion 17 for the impact bar holding clip 12. The forward or first loop being of a single thickness of material and flaring forwardly away from the second loop 15 and of increased curvature for the connecting or intermediate portion 16, is sufficiently flexible to yield under light impact, while the second loop is brought forwardly sufficiently to have a yielding capacity and positioned to reinforce or brace the first loop under heavy impact. The rear loop acts as a spacer and establishes a maximum deflection of the spring, and this way also eliminates breakage on severe impacts, the rear loop being capable of touching the tail or attaching end of the spring with a maximum deflection of approximately 3½ or 4 inches. The phase operation of the spring allows maximum flexibility for the forward loop which is reinforced by the inner loop proportionately with the load supplied.

The double spring portion near the bar gives the spring a sturdy appearance and a better proportioned appearance in relation to the bar. It also reduces general vibration resulting from the travel of the car, so that there is no rattle, and the clamping parts will not work loose.

The split clip 12 has an eye portion engaged about the tubular impact bar with the rear side nested in the seat 16 formed in the front or forward loop 14 of the spring and secured to the spring by a bolt 18 placed so that its longitudinal axis is preferably along the diametric line of the impact bar. The head of the bolt engages into a recess or notch 19 in the impact bar, serving as a key to lock the bar against rotative or longitudinal movement. The clip frictionally clamps the impact bar to the spring with the compression ends or lips 21 of the clip compressed together and secured to the front loop by a bolt 22.

The front loop 14 assumes approximately a vertical position and extends upwardly to a height for providing a fender area eliminating over and under riding of other bumpers and yields in an angular downward direction, transmitting the shocks to the car frame and car springs, so that the force of any impact is not borne entirely by the bumper springs, and being reinforced by the second or rear loop the spring can be made of sufficient light material so that it will give readily under a small impact, thus giving increased flexibility, and in bringing the ends of the metal together and upon one another for the attaching end stability is obtained at points most required.

Having described my invention, I claim:

1. A bumper for vehicles, comprising an impact bar, and impact bar sustaining springs for attaching the bar to opposite sides of the vehicle frame, each spring of a single flat metal bar bent into plural loop formation joined and spaced apart at one end providing a pair of flexible stanchions for carrying said impact bar and at the opposite end lapped together to provide a stable attachment end for securing the spring to the vehicle.

2. A bumper for vehicles, comprising an impact bar, and impact bar sustaining springs for attaching the bar to opposite sides of the vehicle frame, each spring of multiple U-formation providing a pair of flexible stanchions for carrying said impact bar and at the opposite end lapped together for securing the spring to the vehicle.

3. A bumper for a vehicle, comprising an impact bar, impact bar sustaining springs for yieldingly connecting the bar to the vehicle at opposite sides thereof, each spring constituting flexible stanchion portions spaced apart, one carrying the impact bar and the second reinforcing the first, a plural leaf portion for connection upon the end of the vehicle frame, and a spring clip engaged about the impact bar and secured to the outer of said stanchions.

4. A bumper for a vehicle, comprising an impact bar, springs for sustaining and connecting said impact bar to the end of the vehicle frame, each spring constituting a pair of loops spaced apart at one end for flexibly sustaining the impact bar and lapping together at the opposite end for attachment to the vehicle frame, the impact bar secured to the first or outer loop and the second loop reinforcing the first, and means for securing the bar to said first loop.

5. A bumper for vehicles, comprising a tubular impact bar, a pair of springs at one end connecting with the bar and at the opposite end to a vehicle frame, each spring comprising a spring metal bar doubled upon itself, U-formed loops provided at one end of double thickness for attachment to a vehicle, and vertically extending portions spaced apart with the impact bar secured to the upper end thereof.

6. A bumper for vehicles, comprising a tubular impact bar, a pair of springs at one end connecting with the bar and at the opposite end to a vehicle frame, each spring comprising a spring metal bar doubled upon itself, U-formed loops provided at one end of double thickness for attachment to a vehicle, vertically extending portions spaced apart with the impact bar secured to the upper end thereof, and a split ring engaging about said bar and fixed to the outer of said vertically extending portions.

7. A bumper for vehicles, comprising a tubular impact bar, a pair of springs for connecting the bar at opposite sides to the end of the vehicle frame, each spring comprising a pair of U-formed loops lapped together at one end for attachment to the vehicle frame and separated at the opposite end and extending vertically for flexibly sustaining the impact bar, the impact bar being secured to the first or outer of said loops, and a spring clip engaged about the bar and seated into a recess formed in the first of said loops and secured thereto and having a keying engagement with said impact bar for locking the bar against rotative and longitudinal motion within the clip.

In witness whereof, I hereunto subscribe my name.

FRED C. WALTER.